United States Patent [19]
Brams et al.

[11] Patent Number: 5,983,205
[45] Date of Patent: Nov. 9, 1999

[54] COMPUTER-BASED METHOD FOR THE FAIR DIVISION OF OWNERSHIP OF GOODS

[75] Inventors: Steven J. Brams, New York; Alan D. Taylor, Glenville, both of N.Y.

[73] Assignee: New York University, New York, N.Y.

[21] Appl. No.: 09/286,031

[22] Filed: Apr. 5, 1999

Related U.S. Application Data

[63] Continuation-in-part of application No. 08/687,647, Jul. 26, 1996, abandoned.
[51] Int. Cl.$^6$ .................................................. G06F 19/00
[52] U.S. Cl. ................................... 705/37; 705/1; 705/10
[58] Field of Search ................................... 705/1, 10, 37

[56] References Cited

U.S. PATENT DOCUMENTS 5,495,412   2/1996   Theissen ..................................... 705/1

OTHER PUBLICATIONS

Brams, Steven J. and Alan D. taylor, "Fair Division: From Cake–cutting to Dispute resolution", Cambridge University Press, (1996).

Brams, Steven J. and Alan D. taylor, "A Procedure for Divorce Settlements", Economic Research Reports, (Feb. 1996), pp. 1–26.

Denoon, David and steven J. Brams, "Fair Division: A New Approach to the Spratly Islands controversy", Economic Research Reports, (Mar. 1996).

Brams, Steven J., D. Marc Kilgour & William S. Zwicker, "The Paradox of Multiple Elections", Economic Research Reports, (Mar. 1996).

*Primary Examiner*—Allen R. MacDonald
*Assistant Examiner*—Jagdish Patel
*Attorney, Agent, or Firm*—Eliot S. Gerber

[57] ABSTRACT

Two methods, "Adjusted Winner (AW)" and "Proportional Allocation (PA)," are provided for the fair division of a collection of items, which could be either real goods or issues in a dispute, between two claimants (parties). The methods can be implemented as a digital computer software program. In both methods, the parties are each given 100 points and then bid on each item using their points. Under the AW method, which is applicable to indivisible items, each party is initially allocated those goods, or wins on those issues, for which it bids the higher number of points. Then the goods or issues are reassigned, or resolved differently, to achieve equality of points based on the quotients of the parties' bids. Under PA, each good or issue is divided according to a ratio based on both parties' bids for that good or issue.

8 Claims, 2 Drawing Sheets

COMPUTER-BASED METHOD FOR THE FAIR DIVISION OF OWNERSHIP OF GOODS

RELATED APPLICATION

This application is a continuation-in-part application partly based on application Ser. No. 08/687,647, filed Jul. 26, 1996, now abandoned.

FIELD OF THE INVENTION

The present invention relates to computer-based methods, implemented by programmed software on a digital computer, to divide goods fairly among a set of claimants.

BACKGROUND OF THE INVENTION

The general problem of dividing property rationally and fairly among two, or more, claimants has been the subject of folklore, biblical stories, and history. A variety of procedures has been extensively written upon by economists, political scientists, mathematicians, and others.

The best-known, and most widely practiced, procedure for two persons is that one divides and the other chooses. For example, to divide a cake, Mary will cut the cake into two pieces, and John will then select which piece he wants, i.e., "divide-and-choose."

Applications of divide-and-choose span about five millennia, from biblical accounts of Abraham and Lot using this procedure to divide land to the recent Law of the Sea Treaty that reserves parcels of seabed for future mining operations by developing countries (developed countries do the "dividing"). The qualities that make this two-person procedure seem both workable and fair have been explicitly set forth by the inventors and others. They include the following:

1. The procedure is conceptually simple, with little reliance on any outside arbitrator or referee. Satisfaction with a fair-division scheme relies, in part, on a feeling that the process (i.e., the step-by-step mechanics leading to the allocation) is fair, as well as the product (i.e., the actual allocation).

2. The procedure is envy-free. That is, neither of the two parties will envy the other in the sense of wishing he or she had the other's share. For two people, this is equivalent to saying that each party thinks he receives at least half the total value in his or her own eyes.

Divide-and-choose, however, also has its drawbacks:

1. It is limited to two people. The mathematical problem of extending this procedure to a constructive one that is envy-free and works for any number of parties was open for over 30 years. It was recently solved by the present inventors; see Brams and Taylor, "An Envy-Free Cake-Division Protocol," *American Mathematical Monthly*. Vol. #1, No. 1, Jan. 1995, pp. 9–18.

2. The resulting allocation need not be efficient. That is, there may be some other allocation that is strictly better for both parties.

3. Although divide-and-choose prevents envy for what the other party receives, the resulting allocation need not be equitable. That is, one party may feel that he received only 60% of the value while knowing that the other party feels that she received 90% of the value. Thus, while neither will envy the other in the sense of wishing to trade, the former will envy the latter's "happiness" (90% bringing more happiness than 60%).

With regard to drawback 1 (the limitation to two people), the procedure considered, prior to this invention, to be the best for obtaining a fair division of a collection of goods (items), when each good is itself non-divisible (indivisible), is called "Knaster's procedure of sealed bids" or "Knaster's procedure." Each of the parties (players) submits sealed bids for each item, for example, to an impartial mediator who administers the procedure. The party who submits the highest bid is awarded the item. However, after the auction is over, some of the money bid for items is divided up among the parties. The procedure requires that each party has money.

The Knaster procedure is illustrated in Table 1 below. There are three parties (Bob, Carol, and Ted) and 4 items A,B,C,D listed in Table 1, for example, a boat, a car, a house lot, and a painting. The amount listed in Table 1 for each party and each item is the amount that that party has bid, in a sealed bid, for that item.

TABLE 1

| | Party | | |
|---|---|---|---|
| | Bob | Carol | Ted |
| Valuation | | | |
| Item A | $10,000 | $4,000 | $7,000 |
| Item B | 2,000 | 1,000 | 4,000 |
| Item C | 500 | 1,500 | 2,000 |
| Item D | 800 | 2,000 | 1,000 |
| Total valuation | 13,300 | 8,500 | 14,000 |
| Items received | A | D | B,C |
| Value received | 10,000 | 2,000 | 6,000 |
| Initial fair share | 4,433 | 2,833 | 4,667 |
| Difference (initial excess/deficit) | 5,567 | −833 | 1,333 |
| Share of surplus | 2,022 | 2,022 | 2,022 |
| Adjusted fair share | 6,455 | 4,855 | 6,689 |
| Final settlement | A − 3,545 | D + 2,855 | B,C + 689 |

Each party has bid a different amount (valuation) for each item, and the total of each party's bids is the total valuation. Each party gets the item for which he, or she, was high bidder; their winning bid is considered the valuation of that item. The "initial fair share" is the party's total valuation divided by the number of parties. For example, Bob's total valuation is $13,300; because there are 3 parties his initial fair share is $4,433. The difference between his value for the item (A) he receives ($10,000) and his initial fair share is $5,567.

These differences for all parties are summed algebraically: $5,567−$833+$1,333=$6,067, which is called the surplus. Each party is assigned one-third of the surplus, i.e., $2,022, which is added to its initial fair share, i.e., Bob's $4,433+$2,022=$6,455, which is his "adjusted fair share." This, in turn, is added (or subtracted) from the valuation of the item he, or she, received, i.e., Bob received item A valued at $10,000, and his adjusted fair share is $6,455 so he has a "final excess" of $10,000−$6,455=$3,545. Bob contributes, in money, this excess to the other parties, with Carol receiving $2,855 and Ted $689.

Knaster's procedure does guarantee envy-freeness in two-person situations but not if there are three or more parties. However, the Knaster procedure requires that the parties have the cash to pay for a final settlement. In many situations, including divorces, one or more parties do not have, and cannot borrow, sufficient money to implement the Knaster procedure.

SUMMARY OF THE INVENTION

In accordance with the present invention, there is provided two computer-based methods for the fair division of goods, one of the methods being more applicable when many of the goods might be indivisible.

These methods may be accepted by potential users, such as parties to a divorce-property settlement, because the methods are readily understood and appear to be fair. Their results are proportional (each party obtains an equal share), they are envy-free (each party prefers his portion to anyone else's), and one is reasonably efficient.

The first method is called the Adjusted Winner (AW) method. A list is made of the goods (items) to be divided between two parties, with each party given "100 points." These points indicate the value each party places on the items and need not correspond to money. In fact, the parties need not have, or distribute, any money. Each of the parties, e.g., Bob and Carol, decides on how many points to bid for each item. The bids are sealed and can be administered by a mediator or other third person.

Bob initially is assigned all the items (goods) on which his bid is higher than Carol's bid. Next items (goods) are transferred to achieve "equitability," that is, until the point totals of the two parties are equal. The decision on which goods to transfer depends on the ratio of the bids, not on the point differences (point spread) between bids.

The method is carried out using a software program implemented on a digital computer. The detailed mathematical proofs and arguments for its envy-freeness, equitability and efficiency are set forth in a book by Brams & Taylor, *Fair Division: From Cake Cutting To Dispute Resolution,* Cambridge Univ. Press, 1996, incorporated by reference herein.

One apparent problem with AW is that one or both of the parties may lie about the true value to them of various items in an attempt to manipulate their bids, based upon what they think the other party will bid. Generally, such manipulation by one party will not be successful—and may even backfire—unless one party knows exactly how many points the other will bid for each item. Consequently, such attempts at exploitation are unlikely even to be tried.

The second method, called Proportional Allocation (PA), is less desirable than AW because it is not efficient. However, it is less subject to manipulation, at least in theory. Thus, a party that thinks another party is not making bids honestly may elect to use PA, which comes closer to inducing all the parties to be truthful, especially if there is the suspicion that advance information on one's bids has been obtained by the other party.

Under PA, as under AW, a list is made of all items. Each party is given 100 points and makes a sealed bid for each of the items which he, or she, wants. However, PA is only applicable to goods that are divisible, such as a record collection in which there are no single items of great value. On occasion, indivisible goods can be treated as divisible if, for example, an agreement is arrived at prior to the division.

Under PA, the portion of each item awarded each party is based on his or her bid, compared to the bids of others. For example, if Bob bids 6 for the record collection and Carol bids 5, the collection is divided so that Bob receives 6/11 and Carol 5/11.

BRIEF DESCRIPTION OF THE DRAWINGS

The inventor's presently known best mode of practicing the invention is explained below in the detailed description, which should be taken in conjunction with the accompanying drawings.

In the drawings.

DETAILED DESCRIPTION OF THE INVENTION

I. Introduction

The present invention presents two computer-based methods, called "Adjusted Winner" (AW) and "Proportional Allocation" (PA) for the fair division of goods between two parties (claimants). The methods will first be explained; then the application of the two methods to situations, involving divorce and estate settlement, will be illustrated in the examples.

Figure 1:
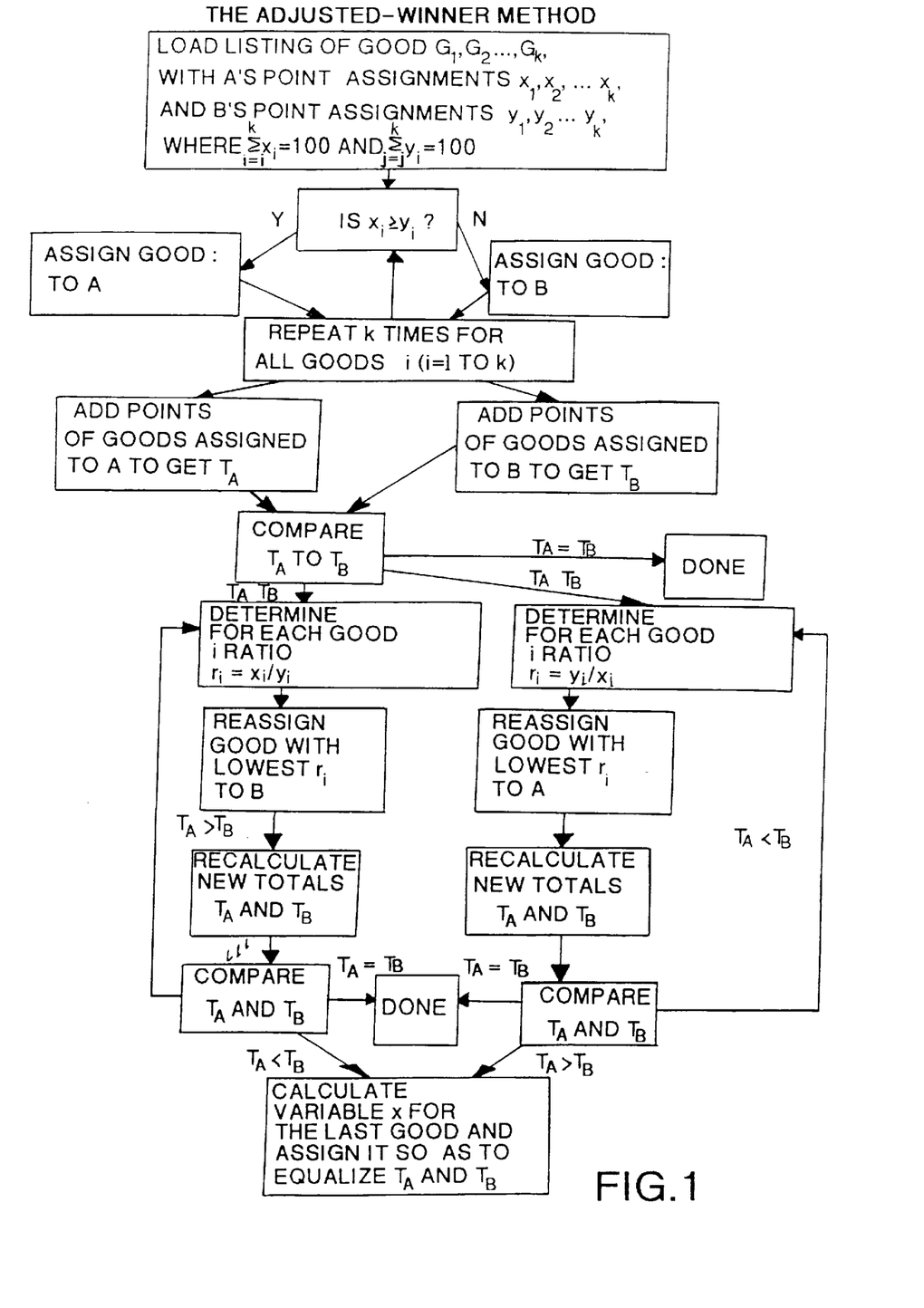
FIG. 1 is a software program flow chart of the Adjusted Winner (AW) method.
Figure 2:
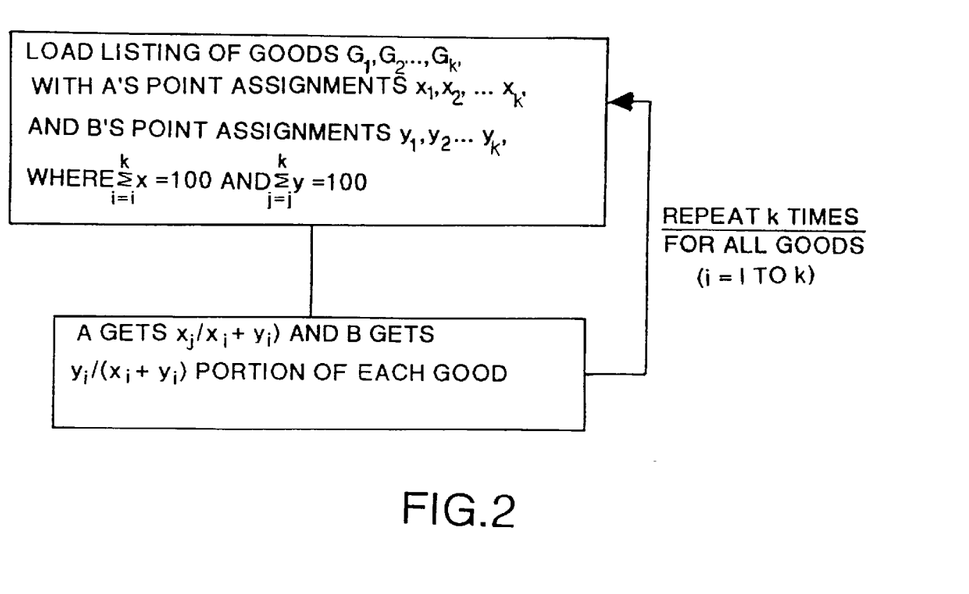
FIG. 2 is a software program flow chart of the Proportional Allocation (PA) method.

The methods are to be carried out using a software program that is executed on a digital computer having a memory, such as a hard disk, and a display, such as a monitor or printer. The software program is illustrated in the flow diagrams of FIGS. 1 and 2. The methods are preferably recorded on a floppy disk, which is sold along with a manual. The disk may, for example, be run on a PC (Personal Computer) using a Microsoft Windows 95 (TM) operating system. The computer calculates and displays reassignment ownership of the goods on the monitor display and/or prints out on the printer. A user assigns and delivers the goods and proportional shares of the goods according to the reassignment of the goods displayed on the monitor or printed out on the printer.

Both the AW and PA methods are applicable to goods which are divisible, e.g., "fungible" in legal terminology. An example of a divisible good would be bags of different grains, e.g., in a farm estate settlement. Parties could simply divide each of the bags equally, i.e., each party gets 50%. This division, however, provides less satisfactory results than either AW or PA if the parties value the different bags differently, e.g., one likes one bag more than the other whereas the other has the opposite preferences.

The case of trying to divide a collection of indivisible goods appears to be a more difficult problem. One cannot cut many goods into pieces and keep their value. In many real-life situations, the goods are not divisible and there is no apparent way to divide them fairly among two or more parties. The AW method is generally applicable to goods which are non-divisible as well as those that are divisible. It requires only that one of the goods, which will not be known in advance, be divisible, or possibly that some money change hands at the end.

Under AW, the two parties explicitly indicate how much they value each of the different goods by distributing 100 points across the goods. This information, which may or may not be made public (known to each other) after the bids are made, becomes the basis for making a fair division of the goods.

Valuations in cake division, by contrast, are implicit. They are reflected in how the parties divide a cake into pieces, which ones they judge to be acceptable, and so on. But they are never required to say explicitly how much they value the different parts of the cake.

Requiring that parties assign points to different goods raises the question of whether they will have an incentive to be honest in announcing their valuations. Preferences are usually private information, and one cannot expect people honestly to reveal them unless it is in their interest to do so.

Adjusted Winner (AW) produces a settlement that is efficient, envy-free, and equitable with respect to the bargainers' announced preferences. However, because AW provides only some inducement for the bargainers to be truthful in announcing their preferences, it may produce settlements that only appear to satisfy these criteria because complete truthfulness is not always advantageous.

For this reason, the second fair-division method, Proportional Allocation (PA), could provide a "default" settlement should either party object to the settlement under AW. That is, PA could be implemented if either party, feeling that it was exploited under AW because of AW's vulnerability to false announcements, requests PA. For reasons to be discussed later, however, this safeguard will hardly ever be necessary.

Like AW, PA is envy-free and equitable; unlike AW, it is extremely robust against false announcements in most situations, thereby inducing the bargainers to be truthful. However, the settlement it yields is not efficient. Nevertheless, it is substantially better for both parties than the naive fair-division procedure of splitting every good 50—50 (if this is even possible).

II. The Adjusted Winner (AW) Method

AW allocates k goods as follows. Let $x_1, \ldots x_k$ be Bob's announced points for goods $1, \ldots k$, and let $y_1, \ldots y_k$ be Carol's announced points. Let X be the sum of the points of all goods that Bob announces that he values more than Carol does. Let Y be the sum of the values of the goods that Carol announces she values more than Bob does. Assume $X \geq Y$. Next, assign the goods so that Bob initially gets all the goods whereby $x_i \geq y_i$, and Carol gets the others. Now list the goods in an order $G_1, G_2$, etc., so that the following hold:

1 Bob, based on his announcement, values goods $G_1, \ldots, G_r$ at least as much as Carol does (i.e., $x_i \geq y_i$ for $1 \leq i \leq r$), where $r \leq k$.

Carol, based on her announcement, values goods $G_{r+1}, \ldots, G_k$ more than Bob does (i.e., $y_i > x_i$ for $r+1 \leq i \leq k$).

3 $x_1/y_1 \leq x_r/y_r$.

Thus, Bob is initially given all goods 1 through r that he values at least as much as Carol, and Carol is given all goods r+1 through k that she values strictly more than Bob.

Because $x_i \geq y_i$ for $1 \leq i \leq r$, the ratios in (3) are all at least 1. Hence, all the goods for which $x_i = y_i$ come at the beginning of the list. Bob—who, because $X \geq Y$, enjoys a advantage (if either party does) after the winner-take-all assignment of goods—is helped additionally by being assigned all goods that the players value equally, based on their announcements.

The next step involves transferring from Bob to Carol as much of $G_1$ as is needed to achieve equitability—that is, until the point totals of the two players are equal. If equitability is not achieved, even with all of $G_1$ transferred from Bob to Carol, we next transfer $G_2$, $G_3$, etc. (in that order) from Bob to Carol. It is the order given by (3), starting with the smallest ratio, that ensures efficiency.

EXAMPLE 1

Suppose there are three goods for which Bob and Carol announce the following point assignments (the larger of the two assignments is underscored):

|  | $G_1$ | $G_2$ | $G_3$ | Total |
|---|---|---|---|---|
| Bob's announced values | <u>6</u> | <u>67</u> | 27 | 100 |
| Carol's announced values | 5 | 34 | <u>61</u> | 100 |

Initially, $G_1$ and $G_2$ are assigned to Bob, giving him 73 of his points, and $G_3$ is assigned to Carol, giving her 61 of her points. Hence, goods must be transferred from Bob to Carol to create equitability.

Notice that $x_1/y_1=6/5=1.2$ and $x_2/y_2=67/34=1.97$, so the smallest ratio of the players' valuations is for $G_1$. Even transferring all of $G_1$ from Bob to Carol, however, still leaves Bob with an advantage (67 of his points to 66 of hers).

Let x denote the fraction of $G_2$ that will be retained by Bob, with the rest transferred from him to Carol. We choose x so that the resulting point totals are equal for Bob (left side of the equation) and Carol (right side of the equation):

$$67x = 5 + 34(1-x) + 61$$

which yields x=100/101=0.99. Consequently, Bob ends up with 99 percent of $G_2$ for a total of 66.3 of his points, whereas Carol ends up with all of $G_1$ and $G_3$ and 1 percent of $G_2$ for the same total of 66.3 of her points. This is the "equitability adjustment", which equalizes the number of points both players possess.

AW produces an allocation of the goods, based on the announced values, that is:

(1) efficient: any allocation that is strictly better for one player is strictly worse for the other;

(2) equitable: Bob's announced valuation of his allocation is the same as Carol's announced valuation of her allocation;

(3) envy-free: neither player would trade his or her allocation for that of the other.

EXAMPLE 2

TABLE 2

Point allocations of Bob and Carol for an estate

| Item | Bob | Carol |
|---|---|---|
| 1 Boat | <u>14</u> | 6 |
| 2 Motor | <u>14</u> | 6 |
| 3 Piano | 2 | <u>17</u> |
| 4 Computer | 1 | <u>17</u> |
| 5 Rifle | 4 | 4 |
| 6 Tools | 2 | <u>6</u> |
| 7 Tractor | <u>21</u> | 2 |
| 8 Truck | <u>14</u> | 8 |
| 9 Moped | 14 | <u>17</u> |
| 10 Moped | 14 | <u>17</u> |
| Total | 100 | 100 |

In applying AW to the division of an estate, AW begins by temporarily assigning each item to whoever puts the most points on it (underscored in Table 2). Thus, Bob initially gets the boat, motor, tractor, and truck, which gives him goods valued at a total of 63 points. Carol receives the piano, computer, tools, and both mopeds, which gives her goods valued at a total of 74 points. Both value the rifle at 4 points so it is awarded initially to Carol under the rules of AW, raising her total to 78. The rifle, however, is the first item transferred from Carol to Bob, which still leaves Carol with an advantage of 74 points to 63+4=67 points for Bob.

To prepare for the next transfer of items from Carol to Bob, we list the items Carol has in order of increasing quotients of Carol's points to Bob's:

one moped: 17/14=1.2 one moped: 17/14=1.2 piano: 17/2=8.5 computer: 17/1=17.0

If we transfer one moped to Bob, his new total will be 67+14=81 points, and Carol's will be 74−17=57 points, indicating we have gone too far. Hence, we must calculate what fraction of the moped Carol must transfer to Bob in order for us to arrive at an equitable allocation, which will be efficient and envy-free as well.

Let x denote the fraction of the moped that will be retained by Carol. Then in order to equalize the point totals, thereby creating equitability, one must have $$57+17x=67+14(1-x),$$

which yields x=24/31=0.774. Thus, Bob and Carol each receive 70.2 of his or her points—a 40-percent increment over half the estate.

Practically speaking, how does one transfer 77.4 percent of a moped from Carol to Bob? Perhaps they could reach an agreement whereby Carol uses it about nine months out of the year and Bob uses it the remaining three months. Perhaps not. A better solution might be that Bob announces what he considers to be a fair price for his 22.6 percent of the moped—say, $226. Carol then chooses between buying Bob out at his price or selling her 77.4 percent share of the moped to Bob for 0.774/0.226=3.4 times the price he announced.

III. The Effect of Lies of a Party

Envy-freeness and equitability both address the question of whether one party believes he or she did at least as well as the other party. The difference is that envy-freeness involves an internal comparison, based on a player's own valuation, which is captured by the following question:

Are you at least as well off with your allocation as you would be with your opponent's allocation and, hence, would not desire to trade with your opponent?

Equitability, on the other hand, involves a more controversial external or interpersonal comparison, which is captured by the following question:

Is your announced valuation of what you received equal to your opponent's announced valuation of what he or she received?

In other words, did you receive, according to your point assignment, exactly what your opponent received according to his or her point assignment?

Equitability, however, need not directly involve the comparison of one player's valuation of his share with the other party's valuation of her share. If there is a fraction x of all the goods being allocated (e.g., ⅔ of each good), and each party is indifferent between receiving this fractional allocation and the allocation that he or she actually received, then the parties' allocations are equitable.

What is called "envy-freeness" and "equitability" are only "apparent envy-freeness" and "apparent equitability" if the parties are not truthful. When they are truthful—$x_i=a_i$ and $y_i=b_i$ for all i, where $a_i$ and $b_i$ are the true values of Bob and Carol, respectively, for good i—each party assuredly receives at least 50 points (based on his or her own valuation), and the surplus above 50 points is the same for each (i.e., his or her "more" is the same as his or her opponent's "more").

The equitability adjustment that gives each party 66.3 of his or her points in Example 1 may be interpreted as providing each party with nearly ⅔ of what he or she perceives to be the total value, or utility, of all three goods. This equalization of the player's utilities assumes that points (or utilities) are additive and linear. Linearity here means that the party's marginal utilities are constant—instead of diminishing as one obtains more of something—so, for example, 2x percent of $G_i$ is twice as good as x percent. Additivity here means that the value of two or more goods to a player is equal to the sum of their points.

Neither assumption is necessarily a good reflection of a party's preferences on certain issues. Thus, goods may not be "separable" because of complementarities—that is, obtaining one good may affect the value one obtains from others.

Perhaps the main drawback of AW is the extent to which it fails to induce the players to be truthful about their valuations—and thereby fails to lead to an envy-free, equitable, and efficient outcome, based on these true valuations. This is easy to illustrate, even in the case of two goods. Suppose Bob values the goods equally, and Carol knows that he will truthfully announce his 50—50 valuation. Suppose Carol's true valuation is 70–30. What should she announce? Assuming that announcements must be integers, the answer is 51–49.

The result of this announcement will be an initial allocation of all of $G_1$ to Carol (which she values at 70), and all of $G_2$ to Bob (which he values at 50). Then there will be a transfer of only a trivial fraction (1/101) of $G_1$ to Bob, since it appears that Carol's initial advantage is only 51 of her points to 50 of Bob's points. Thereby Carol will end up with a generous 70–0.7=69.3 points (according to her true valuations), but Bob will realize only 50+0.5=50.5 points (according to his true valuations).

Bob can turn the tables on Carol if he knows her values of 70–30 and that she will announce these. If Bob announces 69–31, there will be a transfer of 39/139 of $G_1$ from Carol to Bob, giving him a total of 50+14.0=64.0 points and her only 70–19.6=50.4 points, based on their true valuations.

Thereby one party (with complete information) can exploit another party (without such information). On the other hand, if both players were truthful in their announcements, there would be a transfer of ⅙ of $G_1$ from Carol (70–30) to Bob (50—50), giving each player 58.3 points.

This is not as large a drawback as might first appear, because generally one party does not have complete information about the other party's valuations (bids). If the list of point allocations of each party is initially sealed, and opened simultaneously, then one party can only guess about the other party's valuations (point allocation bids on each item). Even in a divorce situation, where, for example, the wife thinks she can guess more or less correctly her husband's bids, she may not have sufficient confidence in her guesses to try to be manipulative, because being off by only one point could hurt her badly in the final allocation.

IV. The Proportional-Allocation (PA) Method

Proportional Allocation (PA) comes closer to inducing the players to be truthful. Consider again our earlier example of exploitation with AW wherein Bob (50—50) announced his true valuation, and Carol (70–30)—knowing Bob's allocation—optimally responded by announcing 51–49. Thereby, Carol obtained 69.3 points, compared with the 58.3 points that truthfulness would have given her (a 17.2 percent increase).

Under PA the optimal response of Carol is to be nearly truthful, announcing 71–29 instead of 70–30. Her benefit from this slight distortion of the truth is only in the third decimal place, gaining her 52.087 points compared to 52.083 points (less than a 0.01 percent increase). Both parties do worse, when truthful, under PA (52.1 points) than under AW (58.3 points), so PA is not efficient.

PA can be used as a default option to AW, which—under the so-called combined procedure—either party can invoke if he or she feels exploited. Although PA does not give an efficient allocation, like AW it is equitable and envy-free. It also comes remarkably close to inducing truthfulness, at least in situations where no single good is of either negligible or of overriding value to either party.

PA, as its name implies, allocates goods proportionally. As before, assume that Bob announces values of $x_1, \ldots, x_k$, and Carol announces values of $y_1, \ldots, y_k$ for goods $G_1, \ldots, G_k$. Assume that for each i, either $x_i=0$ or $y_i=0$. Then Bob is allocated the fraction of $x_i/(x_i+y_i)$ of $G_i$, and Carol the fraction $y_i/(x_i+y_i)$.

EXAMPLE 3

Consider our earlier example of three goods, for which Bob and Carol announce the following point assignments:

|  | $G_1$ | $G_2$ | $G_3$ | Total |
|---|---|---|---|---|
| Bob's announced values | 6 | 67 | 27 | 100 |
| Carol's announced values | 5 | 34 | 61 | 100 |

TABLE 3

Optimal responses of Bob to Carol's announced valuations under PA

| True valuation of Bob | Announced valuation of Carol | | | | | | |
|---|---|---|---|---|---|---|---|
|  | 20 | 30 | 40 | 50 | 60 | 70 | 80 |
| 20 | 20 | 19.32 | 17.98 | 16.67 | 15.96 | 16.61 | 20 |
| 30 | 29.32 | 30 | 29.67 | 29.13 | 29.00 | 30 | 33.39 |
| 40 | 37.98 | 39.67 | 40 | 39.90 | 40 | 41.00 | 44.04 |
| 50 | 46.67 | 49.13 | 49.90 | 50 | 50.10 | 50.87 | 53.33 |
| 60 | 55.96 | 59.00 | 60 | 60.10 | 60 | 60.33 | 62.02 |
| 70 | 66.61 | 70 | 71.00 | 70.87 | 70.33 | 70 | 70.68 |
| 80 | 80 | 83.39 | 84.04 | 83.33 | 82.02 | 80.68 | 80 |

Bob is awarded 6/11 of $G_1$, 67/101 of $G_2$, and 27/88 of $G_3$, giving him a total of 55.9 of his points. Likewise, Carol also receives a total of 55.9 of her points (recall that AW awarded both parties 66.3 points when they were truthful, or 18.6 percent more than PA gives in this example).

However, PA requires that all the goods be divisible (fungible), or that a prior agreement be obtained as to what a division of the goods may mean. Thus, a vacation house can be "divided," by agreement of the parties, before they start the PA method, by usage according to weeks. For example, a ⅒th portion is about 5 weeks usage.

The naive procedure of splitting every good 50—50 gives each party exactly 50 points, so it is equitable and envy-free. Yet not only is this allocation less efficient than AW (66.3 points for each party in the earlier example), but it is also less efficient than PA (55.9 points for each party).

Used alone, AW has a major advantage over the combined procedure (in which PA may be used): goods can be indivisible, except on the one good on which an equitability adjustment must be made, because a party wins or loses completely on each. Although the parties may need to spell out beforehand what each side obtains when it wins or loses under AW, if the items to be divided are issues rather than goods, only on the issue on which an equitability adjustment must be made will a finer breakdown be necessary. And on that issue (or good), it might be possible for one party to make a payment to the other in lieu of dividing this item.

There is no allocation procedure that can guarantee the three properties of efficiency, envy-freeness and equitability when there are more than two parties. The fact that AW guarantees all three in the two-person case is encouraging, despite its theoretical (but probably not practical) vulnerability to manipulation.

Modifications can be made in the above-described embodiments within the scope of the claims. For example, the division may be of chores (unpleasant work assignments), of adverse pollution effects, or other "bads" instead of "goods." However, the term "goods," as used in the claims, includes such division of negative effects. Another modification would be to allow for entitlements, as stated, for example in a will, whereby one party would be entitled to receive proportionally more of the goods it desires than the other party.

The term "goods", as used in the claims, includes issues as well as physical items.

The terms "assign" "deliver" "receive", when referring to goods, means to assign ownership of goods, deliver ownership of goods and receive ownership of goods. The computer display, such as a monitor or printer, shows, for example, the assignments and reassignments of ownership of goods, i.e., the display of reassignment of ownership of goods after computer calculations in the Adjusted Winner method. In that method, a user, as the last step, will assign and deliver the goods according to the reassignment of those goods.

The following is an abbreviated excerpt from Brams and Taylor, *The Win-Win Solution: Guaranteeing Fair Shares to Everybody* (New York: W. W. Norton, forthcoming June 1999), illustrating the applicability of Adjusted Winner (AW) to real-life cases. There are several other cases in that book relating to such areas as international relations (the 1978 Camp David agreement and the current Spratly Islands dispute), politics (determining the format of presidential campaign debates), and business (resolving social issues in company mergers), such as who becomes the CEO and where the headquarters of the merged company is located).

As an example of how the "adjusted winner" (AW) method could have been applied to a divorce settlement, consider the termination of the 13-year marriage of Donald and Ivana Trump in 1991.

The Trumps were successful in reaching a settlement, which principally involved contested property. Many couples, however, are less successful not only in dividing property, which may have sentimental value, but also in dealing with the children and money.

Donald Trump's authorship of Trump: The Art of the Deal (1987) argued well for his finding a suitable "deal" for ending his marriage with Ivana. However, the book is less advice on working out a deal and more a paean to Donald's success in getting his way in countless negotiations. However, Ivana had her own cards to play, making her probably the equal of Donald and rendering AW, therefore, appropriate to apply to their divorce case.

The lawyers on both sides of the divorce were pessimistic that Donald and Ivana could reach a satisfactory agreement on their own. A long and costly court battle seemed inevitable, especially in light of the prenuptial and postnuptial agreements made by the Trumps that were later contested by Ivana.

In the Trumps' prenuptial agreement, which was revised three times during their marriage, Ivana was entitled to a settlement of about $14 million and the couple's Greenwich, Conn., mansion. In addition, she waived her right to marital property in the first three agreements. Her lawyers argued, however, that she never did in the fourth agreement, which was the basis of a lawsuit she initiated in early 1990.

In this lawsuit, she demanded half of all marital assets, which she estimated to be about $5 billion, under New York State's 1980 Marital Equitable Distribution Law. In late 1990, however, after Donald Trump confirmed the precariousness of his financial situation and the $5 billion figure was seen to be far off the mark, Ivana said she only wanted to be "fair" and abandoned her lawsuit.

Understanding Donald's serious risk of bankruptcy, Ivana realized that if she did not settle quickly, she might be no more than just another person in a long line of creditors. But Donald Trump, not ready to strike one of his vaunted deals, saw no reason not to abide by the postnuptial agreement, which his lawyer contended was "more than ironclad, it's steel-wrapped"; Ivana's attempt to get around it would be like "trying to break down a steel door with a feather."

Nevertheless, Donald insisted that he, too, wanted to be "fair." He hoped he could reach an agreement with Ivana outside the courtroom. When Ivana abandoned her lawsuit and said that she was willing to negotiate a settlement in early 1991, Donald was only too willing to comply. Disregarding the assets most likely to be taken over by the banks and the business properties to which Ivana was not entitled (including the Trump shuttle, a 282-foot yacht called the Trump Princess, and a personal Boeing 727 jet), the real estate in dispute comprised:

A 46-room estate in Greenwich, Conn.;

A 118-room Mar-a-Lago mansion in Palm Beach, Fla.;

A Trump Plaza apartment in New York City;

A 50-room Trump Tower triplex in New York City.

The couple also had to reach an agreement on a fixed sum of cash to be paid to Ivana by Donald, and child support for their three children (ages 12, 8 and 6 at the time of the divorce), over whom Ivana would retain custody and with whom Donald would have visiting rights.

Except for Ivana's estimated $1.2 million in cash and jewelry, there were no cash or receivables in the divorce; Donald was barely solvent, let alone liquid. Most of his businesses were either in the red or just breaking even.

It seems plausible that Donald and Ivana would have allocated the following points to the different pieces of real estate:

| Property | Donald | Ivana |
|---|---|---|
| Connecticut estate | 10 | 40 |
| Palm Beach mansion | 40 | 20 |
| Trump Plaza apartment | 10 | 30 |
| Trump Tower triplex | 40 | 10 |
| Total | 100 | 100 |

Hypothetical Point Assignments By The Trumps

Notice that Ivana places great importance on the Connecticut estate, which had been the primary family home. Her acquisition of this property is consistent with all four marital agreements that the couple had signed.

On the other hand, Donald is far more interested in the Palm Beach mansion, which had been a vacation home. His intention was to divide its surroundings into eight large development areas,to be called the mansions at Mar-a-Lago," while keeping the 118-room main house for himself.

Ivana has a greater interest than Donald in the apartment at the Plaza Hotel, where she was living with the children during the couple's separation. He had moved to the triplex at Trump Tower and had a correspondingly greater interest in retaining it.

Applying AW, Donald is awarded initially the Palm Beach mansion and the Trump Tower triplex, giving him 80 of his points, whereas Ivana receives the Trump Plaza apartment and the Connecticut estate, giving her 70 of her points (these initial winnings are underscored in the hypothetical point assignments). But now the equitability adjustment demands that Donald give back some of his points on the smallest-ratio item he wins, namely, the Palm Beach mansion (40/20=2, which is less than 40/10=4) on the Trump Tower Triplex.

Let x denote the fraction on the Palm Beach mansion that Ivana will get. Equalizing the points of Donald and Ivana requires that $$70+20x=80-40x.$$

solving for x gives $$60x10$$

$$x=1/6=0.17$$

Thus, Ivana gets about 17% of the mansion and Donald keeps about 83%. This adjustment results in each spouse's receiving 73.3% of his or her points, which is nearly three-fourths of the total value.

The actual settlement almost exactly matched the hypothetical AW settlement. Ivana received the Connecticut estate and the Plaza apartment, and Donald received the Trump Tower triplex. As for the Palm Beach mansion, it was not physically divided or sold, but Ivana could use it as a vacation home one month a year to be around her socialite friends, which was important to her.

In addition, Donald was obligated to pay Ivana $14 million in cash and $650,000 in annual child support, which had been stipulated in the original marital agreement. This settlement mirrors well Ivana's 17% equitability on the Palm Beach mansion.

AW could provide many divorcing couples with rapid closure of their often endless haggling over money, physical property, and the children. Like the Trumps, each spouse, because of personal circumstances or for sentimental reasons, may attach different values to different items. By indicating this with their point allocations under AW, they could both end up with what they perceive to be two-thirds to three-fourths of what they want, as did the Trumps, according to our calculation.

If how much one item is valued depends on whether one wins another item, the items are not separable and undermine the application of AW. However, there are ways to handle this. Assume that one contested item is the house, but one spouse does not have the means to maintain it. Because winning it alone in a settlement is of little value to that spouse, the house and its maintenance are not separable.

In a case like this, possession of the house might be combined with a maintenance allowance if one spouse wins, whereas if the other spouse wins, he or she might get only the house (without a maintenance allowance). Thus, instead of treating the house as a single object in which winning means the same—possession of the house—for both spouses, it can be treated as an issue in which winning gives a different outcome for each.

There are three advantages to using AW in divorce settlements. First, the impersonal assignment of points will help a couple separate the strong emotions and bittersweet feelings that often accompany divorce from the actual division of the marital property, including children, that will be part of the settlement. Second, AW will induce each spouse to think carefully about what he or she most values and wants out of a settlement. Thus, the assignment of points to items will weaken one's desire to spite the other person, because to do so would be to give up points on something one may value more.

Finally, having to give up "hard points" rather than "soft" positions will minimize posturing in the negotiations prior to applying AW. For example, a wife is likely to see through a husband's threat to put a lot of points on the children or on child support if she knows he really wants to win on alimony. This threat might be effective in negotiations without AW, forcing the wife to give up alimony, for example, if she very much desires to keep custody of the children. With AW, this threat will tend to be seen as a bluff if the wife believes, in the end, that the husband will not match her points on the children.

Consider another problem that may occur when AW is used: One parent may not want a child to know that he or she is worth fewer points to that parent than the other. This problem can be solved by using a trusted referee or mediator to implement AW, who would not reveal the disputants' point allocations but simply announce the assignments. Because of the equitability adjustment, these assignments will not be a sure-fire guide to which parent allocated more points to any item.

In the end, with or without revelation of the point assignments, AW determines the final settlement. It is likely to foster compromises on the issues if, in fact, the parties are encouraged by the procedure to be truthful about what they most value.

What is claimed is:

1. A method involving the use of a software program executed on a digital computer having computer memory and a display for the fair division of ownership of a collection of goods between two parties; the method, including the steps, in sequence, of:
   (a) allocating to each party an equal number of points;
   (b) having each party allocate that party's points to each of the goods, based on that party's relative valuation of each of the goods;
   (c) recording in computer memory each party's allocation of points;
   (d) initially, having the computer calculate an assignment to each party of ownership of each good for which that party allocated more points than the other party; and
   (e) having the computer calculate and then assign ownership of goods to achieve equitability of points by ownership of goods, based on the ratio of the parties' allocations of points for each good, in sequence, based on increasing quotients of the ratios;
   (f) displaying the reassignment ownership of the goods of (e) on the computer display; and
   (g) having a user assign and deliver all but one of the goods, and proportional shares of that one good, according to the reassignment of the goods of (e).

2. A method as in claim 1, and having, in (b), each party allocate his or her points without disclosure to any other party until after completion of point allocation by all the parties.

3. A method as in claim 1 and in (b) having each party submits sealed bids to allocate his or her points.

4. A method as in claim 1 and having in (e) each party reassign ownership of goods from a party that receives goods valued at more points to the other party by first reassigning ownership of goods for which the parties have allocated the same points.

5. A digital computer-based method, using a digital computer having a display, for the fair division of ownership of a set of non-divisible goods between two parties, the method including the steps, in sequence, of:
   (a) allocating to each party an equal number of points, the points having no fixed monetary or economic significance;
   (b) having each party bid on each good in a sealed bid to a computer operator according to his or her valuation of the good;
   (c) in the computer, recording the bids and calculating which party initially should be assigned ownership of each good by having bid more points for that good, and summing the points each party receives;
   (d) determining the goods to be reassigned ownership to obtain equality of points, on the basis of:
      (i) reassigning the ownership of goods for which the bids are equal to a party that has initially received fewer points in (c), and then
      (ii) reassigning ownership of goods in the sequence of increasing quotients of the parties' bids;
   (e) displaying the reassignment of (d) on the computer display; and
   (f) having a computer user assign and deliver all of the goods according to the reassignment of ownership of (d).

6. A method, as in claim 5, and, in (b), having each party bid at least 1 point for each good.

7. A method involving the use of a software program executed on a digital computer having computer memory and a display, for the fair division of a collection of goods between the two parties A and B, the method including, in sequence, the following steps:
   (a) A and B are given the same total number of points to allocate among k goods;
   (b) A and B allocate one or more points to each good, without informing the other party of their allocations, based on each party's relative valuation of that good, so that these allocations sum to the total number of points, the points having no fixed monetary or economic significance;
   (c) the points assignments of A and B to each good are recorded in computer memory;
   (d) the computer makes an assignment of ownership of each good either to A or B, depending on which party allocated more points to that good; if the parties allocated an equal number of points to a good, it is assigned to A;
   (e) the computer calculates the total number of points that A receives and that B receives, based on the assignments in (d);
   (f) if these totals are equal, A and B receive ownership of the good each was assigned;
   (g) the computer displays ownership of each good;
   (h) if these totals are not equal, the ownership of the goods is reassigned on the basis of:
      (I) first reassigning the ownership of goods for which the point allocations are equal to the party that received fewer points in (d); and
      (II) then reassigning ownership of goods in the sequence of increasing quotients increasing quotients of the parties' point allocations, until that party that had the total of fewer points in (e) receives the same number of points or more points than the party that had more points initially;
   (i) if the party that had fewer points initially has the same number after reassignments according to (g), the computer displays ownership of each good;
   (j) if the party that had fewer points initially has more points after reassignments according to (g), the computer equalizes the point assignments according to the equitability adjustment of (h);

(k) the computer displays ownership, and portions of ownership, of each good; and (l) a computer user assigns and delivers ownership of all goods, except possibly the one on which there is an equitability adjustment, and proportional ownership shares of the good on which there is an equitability adjustment.

8. A method involving the use of a software program executed on a digital computer memory and a display, for the fair division of a collection of goods between two parties A and B, the method including, in sequence, the following steps:

(a) A and B are given the same total number of points to allocate among k goods;

(b) A and B, without informing the other party of their allocations, allocate one or more points to each good, based on each party's relative valuation of that good, so that these allocations sum to the total number of points, the points having no fixed monetary or economic significance;

(c) the points assignments of A and B to each good are recorded in the computer memory;

(d) the computer calculates the portion of ownership of each good to be assigned to A and to B on the basis of the ratio of their point allocations;

(e) the computer displays the portions of ownership of each good; and (f) a computer user assigns and delivers the portions of ownership of each good to A and B according to the assignments of (d).

* * * * *